United States Patent
Yeo et al.

(10) Patent No.: US 12,299,142 B2
(45) Date of Patent: *May 13, 2025

(54) RESPONSE-HIDING SEARCHABLE ENCRYPTION

(71) Applicant: Google LLC, Mountain View, CA (US)

(72) Inventors: Kevin Yeo, Mountain View, CA (US); Sarvar Patel, Montville, NJ (US); Giuseppe Persiano, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,556

(22) Filed: May 4, 2023

(65) Prior Publication Data

US 2023/0274007 A1 Aug. 31, 2023

Related U.S. Application Data

(63) Continuation of application No. 16/715,994, filed on Dec. 16, 2019, now Pat. No. 11,669,624.

(60) Provisional application No. 62/838,111, filed on Apr. 24, 2019.

(51) Int. Cl.
  *G06F 21/60* (2013.01)
  *G06F 21/62* (2013.01)
  *H04L 9/08* (2006.01)
  *G06F 21/10* (2013.01)

(52) U.S. Cl.
  CPC ........ *G06F 21/602* (2013.01); *G06F 21/6227* (2013.01); *H04L 9/0894* (2013.01); *G06F 21/107* (2023.08); *G06F 2221/2107* (2013.01)

(58) Field of Classification Search
  CPC .. G06F 21/107; G06F 21/6227; G06F 21/602; G06F 2221/2107; H04L 9/0894
  See application file for complete search history.

(56) References Cited

U.S. PATENT DOCUMENTS

| | | | |
|---|---|---|---|
| 8,185,523 B2 | 5/2012 | Lu et al. | |
| 9,442,980 B1 | 9/2016 | Trepetin et al. | |
| 9,519,798 B2 * | 12/2016 | Egorov | H04L 67/10 |
| 10,762,229 B2 | 9/2020 | Sion et al. | |

(Continued)

OTHER PUBLICATIONS

Ferov, Michal, and Marek Madry. "Enhancing lambdamart using oblivious trees." arXiv preprint arXiv:1609.05610 (2016). (Year: 2016).

*Primary Examiner* — Syed A Zaidi
(74) *Attorney, Agent, or Firm* — Honigman LLP; Brett A. Krueger (57) ABSTRACT

A method for providing response-hiding searchable encryption includes receiving a search query for a keyword from a user device associated with a user. The keyword appears in one or more encrypted documents within a corpus of encrypted documents stored on an untrusted storage device. The method also includes accessing a document oblivious key-value storage (OKVS) to obtain a list of document identifiers associated with the keyword. Each document identifier in the list of document identifiers associated with a respective keyword identifier is concatenated with the keyword and uniquely identifies a respective one of the one or more encrypted documents that the keyword appears in. The method also includes returning the list of document identifiers obtained from the document OKVS to the user device.

20 Claims, 7 Drawing Sheets

(56) References Cited

U.S. PATENT DOCUMENTS

| | | | |
|---|---|---|---|
| 11,144,663 B2* | 10/2021 | Yavuz | G06F 16/13 |
| 11,228,568 B1* | 1/2022 | Dey | H04W 12/02 |
| 11,374,961 B2 | 6/2022 | Brooks | |
| 2013/0138438 A1 | 5/2013 | Bachtiger et al. | |
| 2013/0173917 A1 | 7/2013 | Clifton et al. | |
| 2014/0344944 A1* | 11/2014 | Olumofin | H04L 9/008 |
| | | | 726/26 |
| 2016/0004874 A1 | 1/2016 | Ioannidis et al. | |
| 2016/0224735 A1* | 8/2016 | Ayday | G16B 50/30 |
| 2018/0349632 A1* | 12/2018 | Bent | H04L 9/008 |
| 2019/0324981 A1* | 10/2019 | Counts | G06F 40/216 |
| 2019/0340381 A1* | 11/2019 | Yavuz | G06F 21/606 |
| 2019/0361842 A1 | 11/2019 | Wood et al. | |
| 2020/0328889 A1* | 10/2020 | Matetic | H04L 9/32 |

\* cited by examiner

FIG. 7

RESPONSE-HIDING SEARCHABLE ENCRYPTION

CROSS REFERENCE TO RELATED APPLICATIONS

This U.S. Patent Application is a continuation of, and claims priority under 35 U.S.C. § 120 from, U.S. patent application Ser. No. 16/715,994, filed on Dec. 16, 2019, which claims priority under 35 U.S.C. § 119(e) to U.S. Provisional Application 62/838,111, filed on Apr. 24, 2019. The disclosures of these prior applications are considered part of the disclosure of this application and are hereby incorporated by reference in their entireties.

TECHNICAL FIELD

This disclosure relates to response-hiding searchable encryption.

BACKGROUND

Searchable encryption (i.e., encrypted search) has garnered significant attention for the past many years. Increasingly, a user or client owns a large corpus of encrypted documents that are stored at a server not under the client's control (i.e., the server is untrusted). With searchable encryption, the client can store his/her encrypted documents on the untrusted server, but still maintain the capability of searching the documents and, for example, retrieve identifiers of all documents containing a specific keyword. However, currently available methods are either extremely computationally expensive (e.g., fully homomorphic encryption) such that they become prohibitive on sufficiently large sets of documents or sacrifice a portion of the security and privacy of the documents.

SUMMARY

One aspect of the disclosure provides a method for providing response-hiding searchable encryption. The method includes receiving, at data processing hardware, a search query for a keyword from a user device associated with a user. The keyword appears in one or more encrypted documents within a corpus of encrypted documents stored on an untrusted storage device. The method also includes accessing, by the data processing hardware, a document oblivious key-value storage (OKVS) to obtain a list of document identifiers associated with the keyword. Each document identifier in the list of document identifiers is associated with a respective keyword identifier concatenated with the keyword and uniquely identifies a respective one of the one or more encrypted documents that the keyword appears in. The method also includes returning, by the data processing hardware, the list of document identifiers obtained from the document OKVS to the user device.

Implementations of the disclosure may include one or more of the following optional features. In some implementations, the method further includes receiving, at the data processing hardware from the user device, a read request including one or more of the document identifiers from the returned list of document identifiers. For each document identifier received in the read request, the method includes retrieving, by the data processing hardware, the respective one of the one or more encrypted documents that the keyword appears in from the untrusted storage device and returning, by the data processing hardware, the retrieved respective one of the one or more encrypted documents that the keyword appears in to the user device. The user device is configured to decrypt the retrieved respective one of the one or more encrypted documents.

The method, in some examples, further includes, for a new encrypted document uploaded by the user into the corpus of encrypted documents stored on the untrusted storage device, receiving, at the data processing hardware from the user device, a set of keywords associated with the new encrypted document and a new document identifier uniquely identifying the new encrypted document. The method may also include determining, by the data processing hardware, whether the new document identifier exists in an identifier OKVS, the identifier OKVS including a set of document identifiers. Each document identifier in the set of document identifiers uniquely identifies a respective one of the encrypted documents within the corpus of encrypted documents stored on the untrusted storage device. When the new document identifier does not exist in the identifier OKVS, the method may include updating, by the data processing hardware, the identifier OKVS with the new document identifier uniquely identifying the new encrypted document. For each keyword in the set of keywords associated with the new encrypted document, the method optionally includes incrementing, by the data processing hardware, a keyword count associated with the keyword in a counts OKVS. The counts OKVS includes a plurality of keyword counts. Each keyword count indicates a number of the encrypted documents within the corpus of encrypted documents that a respective keyword appears in. The method may also include inserting, by the data processing hardware, a concatenation of the keyword and a respective keyword identifier associated with the new document identifier into the document OKVS.

The method, where incrementing the keyword count associated with the keyword in the counts OKVS, may include, when the keyword count is greater than or equal to one, increasing the keyword count by one. The method may also include, when the keyword count is not greater than or equal to one, setting the keyword count to one. In some implementations, the method further includes, when the new document identifier exists in the identifier OKVS, discarding, by the data processing hardware, the new document identifier and the set of keywords associated with the new encrypted document.

In some examples, where the search query for the keyword received from the user device includes a query count, the query count specifies a number of document identifiers to obtain from the document OKVS. Accessing the document OKVS to obtain the list of document identifiers may include limiting a number of the document identifiers included in the list of document identifiers to the number specified by the query count. When the number of document identifiers included in the list of document identifiers obtained from the documents OKVS is less than the number specified by the query count, the method, in some implementations, includes appending, by the data processing hardware, one or more dummy document identifiers to the list of document identifiers for return to the user device. Optionally, the respective keyword identifier associated with each document identifier in the list of document identifiers obtained from the document OKVS includes a unique numerical indicator indicating a creation date of the document identifier relative to creation dates of the other document identifiers in the list of document identifiers.

In some implementations, the method further includes, prior to accessing the document OKVS, accessing, by the data processing hardware, a counts OKVS to determine a number of the one or more encrypted documents the keyword appears. The counts OKVS includes a plurality of keyword counts. Each keyword count indicates a number of the encrypted documents within the corpus of encrypted documents that a respective keyword appears in. The method further includes, in some examples, accessing, by the data processing hardware, a deletion OKVS to identify one or more document identifiers associated with a deletion of the keyword. Each identified document identifier is concatenated with the keyword and uniquely identifies a respective one of the one or more encrypted documents in which the keyword is deleted. The list of document identifiers obtained from the document OKVS may exclude any of the one or more document identifiers identified from the deletion OKVS.

In some implementations, the deletion OKVS includes a set of keywords concatenated with document identifiers. Each keyword in the set of keywords concatenated with a respective document identifier uniquely identifies a respective encrypted document within the corpus of encrypted documents in which the keyword appears in or has been deleted from. In some examples, the method further includes, for an updated encrypted document uploaded by the user into the corpus of encrypted documents stored on the untrusted storage device, receiving, at the data processing hardware from the user device, a set of keywords associated with the updated encrypted document and a document identifier uniquely identifying the updated encrypted document. For each keyword in the set of keywords associated with the updated encrypted document, the method may include incrementing, by the data processing hardware, a keyword count associated with the keyword in a counts OKVS. The counts OKVS includes a plurality of keyword counts. Each keyword count indicates a number of the encrypted documents within the corpus of encrypted documents that a respective keyword appears in. The method may also include inserting, by the data processing hardware, a concatenation of the keyword and a respective keyword identifier associated with the document identifier into the document OKVS and updating, by the data processing hardware, a deletion status of the associated concatenation in the deletion OKVS to indicate that the keyword is not deleted from the associated encrypted document.

The method optionally further include, for an existing encrypted document in the corpus of encrypted documents stored on the untrusted storage device, receiving, at the data processing hardware from the user device, a deletion request including set of keywords to be deleted from the existing encrypted document and a document identifier uniquely identifying the existing encrypted document. For each keyword in the set of keywords to be deleted from the existing encrypted document, the method includes updating, by the data processing hardware, a deletion status associated with the keyword concatenated with the respective document identifier in the deletion OKVS to indicate that the keyword is deleted from the existing encrypted document uniquely identified by the respective document identifier.

Another aspect of the disclosure provides a system for providing response-hiding searchable encryption. The system includes data processing hardware and memory hardware in communication with the data processing hardware. The memory hardware stores instructions that when executed on the data processing hardware cause the data processing hardware to perform operations. The operations include receiving a search query for a keyword from a user device associated with a user. The keyword appears in one or more encrypted documents within a corpus of encrypted documents stored on an untrusted storage device. The operations also include accessing a document oblivious key-value storage (OKVS) to obtain a list of document identifiers associated with the keyword. Each document identifier in the list of document identifiers is associated with a respective keyword identifier concatenated with the keyword and uniquely identifies a respective one of the one or more encrypted documents that the keyword appears in. The operations also include returning the list of document identifiers obtained from the document OKVS to the user device.

This aspect may include one or more of the following optional features. In some implementations, the operations further include receiving, from the user device, a read request including one or more of the document identifiers from the returned list of document identifiers. For each document identifier received in the read request, the operations include retrieving the respective one of the one or more encrypted documents that the keyword appears in from the untrusted storage device and returning the retrieved respective one of the one or more encrypted documents that the keyword appears in to the user device. The user device is configured to decrypt the retrieved respective one of the one or more encrypted documents.

The operations, in some examples, further include, for a new encrypted document uploaded by the user into the corpus of encrypted documents stored on the untrusted storage device, receiving, from the user device, a set of keywords associated with the new encrypted document and a new document identifier uniquely identifying the new encrypted document. The operations may also include determining whether the new document identifier exists in an identifier OKVS, the identifier OKVS including a set of document identifiers. Each document identifier in the set of document identifiers uniquely identifies a respective one of the encrypted documents within the corpus of encrypted documents stored on the untrusted storage device. When the new document identifier does not exist in the identifier OKVS, the operations may include updating the identifier OKVS with the new document identifier uniquely identifying the new encrypted document. For each keyword in the set of keywords associated with the new encrypted document, the operations optionally include incrementing a keyword count associated with the keyword in a counts OKVS. The counts OKVS includes a plurality of keyword counts. Each keyword count indicates a number of the encrypted documents within the corpus of encrypted documents that a respective keyword appears in. The operations may also include inserting a concatenation of the keyword and a respective keyword identifier associated with the new document identifier into the document OKVS.

The operations, where incrementing the keyword count associated with the keyword in the counts OKVS, may include, when the keyword count is greater than or equal to one, increasing the keyword count by one. The operations may also include, when the keyword count is not greater than or equal to one, setting the keyword count to one. In some implementations, the operations further include, when the new document identifier exists in the identifier OKVS, discarding the new document identifier and the set of keywords associated with the new encrypted document.

In some examples, where the search query for the keyword received from the user device includes a query count, the query count specifies a number of document identifiers to obtain from the document OKVS. Accessing the document OKVS to obtain the list of document identifiers may include limiting a number of the document identifiers included in the list of document identifiers to the number specified by the query count. When the number of document identifiers included in the list of document identifiers obtained from the documents OKVS is less than the number specified by the query count, the operations, in some implementations, include appending one or more dummy document identifiers to the list of document identifiers for return to the user device. Optionally, the respective keyword identifier associated with each document identifier in the list of document identifiers obtained from the document OKVS includes a unique numerical indicator indicating a creation date of the document identifier relative to creation dates of the other document identifiers in the list of document identifiers.

In some implementations, the operations further include, prior to accessing the document OKVS, accessing a counts OKVS to determine a number of the one or more encrypted documents the keyword appears. The counts OKVS includes a plurality of keyword counts. Each keyword count indicates a number of the encrypted documents within the corpus of encrypted documents that a respective keyword appears in. The operations further include, in some examples, accessing a deletion OKVS to identify one or more document identifiers associated with a deletion of the keyword. Each identified document identifier is concatenated with the keyword and uniquely identifies a respective one of the one or more encrypted documents in which the keyword is deleted. The list of document identifiers obtained from the document OKVS may exclude any of the one or more document identifiers identified from the deletion OKVS.

In some implementations, the deletion OKVS includes a set of keywords concatenated with document identifiers. Each keyword in the set of keywords concatenated with a respective document identifier uniquely identifies a respective encrypted document within the corpus of encrypted documents in which the keyword appears in or has been deleted from. In some examples, the operations further include, for an updated encrypted document uploaded by the user into the corpus of encrypted documents stored on the untrusted storage device, receiving, from the user device, a set of keywords associated with the updated encrypted document and a document identifier uniquely identifying the updated encrypted document. For each keyword in the set of keywords associated with the updated encrypted document, the operations may include incrementing a keyword count associated with the keyword in a counts OKVS. The counts OKVS includes a plurality of keyword counts. Each keyword count indicates a number of the encrypted documents within the corpus of encrypted documents that a respective keyword appears in. The operations may also include inserting a concatenation of the keyword and a respective keyword identifier associated with the document identifier into the document OKVS and updating a deletion status of the associated concatenation in the deletion OKVS to indicate that the keyword is not deleted from the associated encrypted document.

The operations optionally further include, for an existing encrypted document in the corpus of encrypted documents stored on the untrusted storage device, receiving, from the user device, a deletion request including a set of keywords to be deleted from the existing encrypted document and a document identifier uniquely identifying the existing encrypted document. For each keyword in the set of keywords to be deleted from the existing encrypted document, the operations include updating a deletion status associated with the keyword concatenated with the respective document identifier in the deletion OKVS to indicate that the keyword is deleted from the associated encrypted document uniquely identified by the respective document identifier.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Searchable encryption (which may also be referred to as encrypted search) has been well studied for more than a decade. The goal of searchable encryption is to enable a client to outsource the storage of a corpus of encrypted documents to an untrusted server. For example, the client may wish to store a large number of documents securely in a cloud-based storage solution. Generally, the client will desire to both maintain the ability to efficiently search the documents (i.e., search for a specific keyword), while simultaneously maintaining the privacy and security of the documents. In order to maintain this privacy, information related to the contents of the documents or the queries from the client must remain hidden from the server. Currently, the only known way to maintain perfect privacy is by using computationally expensive cryptographic primitives such as fully homomorphic encryption. The large performance overheads of these primitives preclude them from being used in practical applications. Instead, most current implementations instead sacrifice a portion of privacy with the aim of improving efficiency.

The privacy of searchable encryption schemes is parameterized by a leakage function. The leakage function is an upper bound on the information revealed to the untrusted server when processing queries over the stored documents. Therefore, it is advantageous for a searchable encryption scheme to minimize the leakage function while maximizing the efficiency of searches. Modern solutions offer a query processing overhead that scales linearly with the number of matching documents with very small hidden constants. Some techniques offer dynamic schemes that also enable inserting new documents and/or modifying existing documents. These systems typically offer an overhead that linearly scales with the number of updated keywords. However, these techniques are all response-revealing. That is, the leakages of these schemes contain the identifiers of matching documents for each query (which may also be known as access pattern leakage).

Using various and continuously improving frequency analysis and statistical learning methods, the contents of documents and/or the queried keywords may be compromised by using exclusively access pattern leakage. For example, some attacks are based on schemes that enable clients to perform range queries. In another scenario, adversaries may inject files into an encrypted search scheme. By carefully arranging keywords in the injected files, adversaries viewing the identifiers of matching injected documents of any query may determine the queried keyword with perfect accuracy. A common denominator among these schemes is that each is response-revealing. Thus, it is advantageous to protect against current and future improvements of these attacks. An effective means of mitigating the risk of these attacks is to employ response-hiding searchable encryption schemes as the previously described attacks critically rely on the fact that leakage of queries includes the identifiers of matching documents. However, current response-hiding schemes incur significantly larger overhead compared to their response-revealing counterparts. In particular, response-hiding schemes perform at least logarithmic server operations for each query response. Additionally, dynamic variants of response-hiding schemes incur at least logarithmic server computation for each modified keyword. Response-hiding is defined as an encryption scheme where the query leakage does not reveal the identifiers of matching documents.

Implementations herein are directed toward an asymptotically optimal, dynamic, response-hiding searchable encryption manager that implements dynamic searchable encryption by using oblivious random access memory (ORAM) in a blackbox manner with constant efficiency in terms of ORAM operations. The manager's leakage consists only of the number of matching documents for queries and the number of unique keywords in inserted documents. ORAM enables a client to access a server-stored array without revealing either the array contents or the indices updated or retrieved. That is, an ORAM hides its access pattern by ensuring that, for every input, the memory locations accessed, are similarly distributed. ORAMs come in many different implementations and efficiencies. For example, there is path ORAMs, square root ORAMs, and tree-based ORAMs. As the searchable encryption manager implements ORAM in a blackbox manner, the manager is compatible with any type of ORAM. Thus, the manager will inherently gain any benefits from improving ORAM technologies. The manager enables a user to query for keywords among a corpus of encrypted documents and retrieve, for example, a list of identifiers containing the queried keyword, metadata regarding the keyword, related topics of identified documents, portions of the document text, or even the entire document text. The manager further enables the user update the encrypted documents (e.g., add, delete, and modify the documents) while minimizing the information that the server learns about stored documents and queried keywords.

Figure 1:
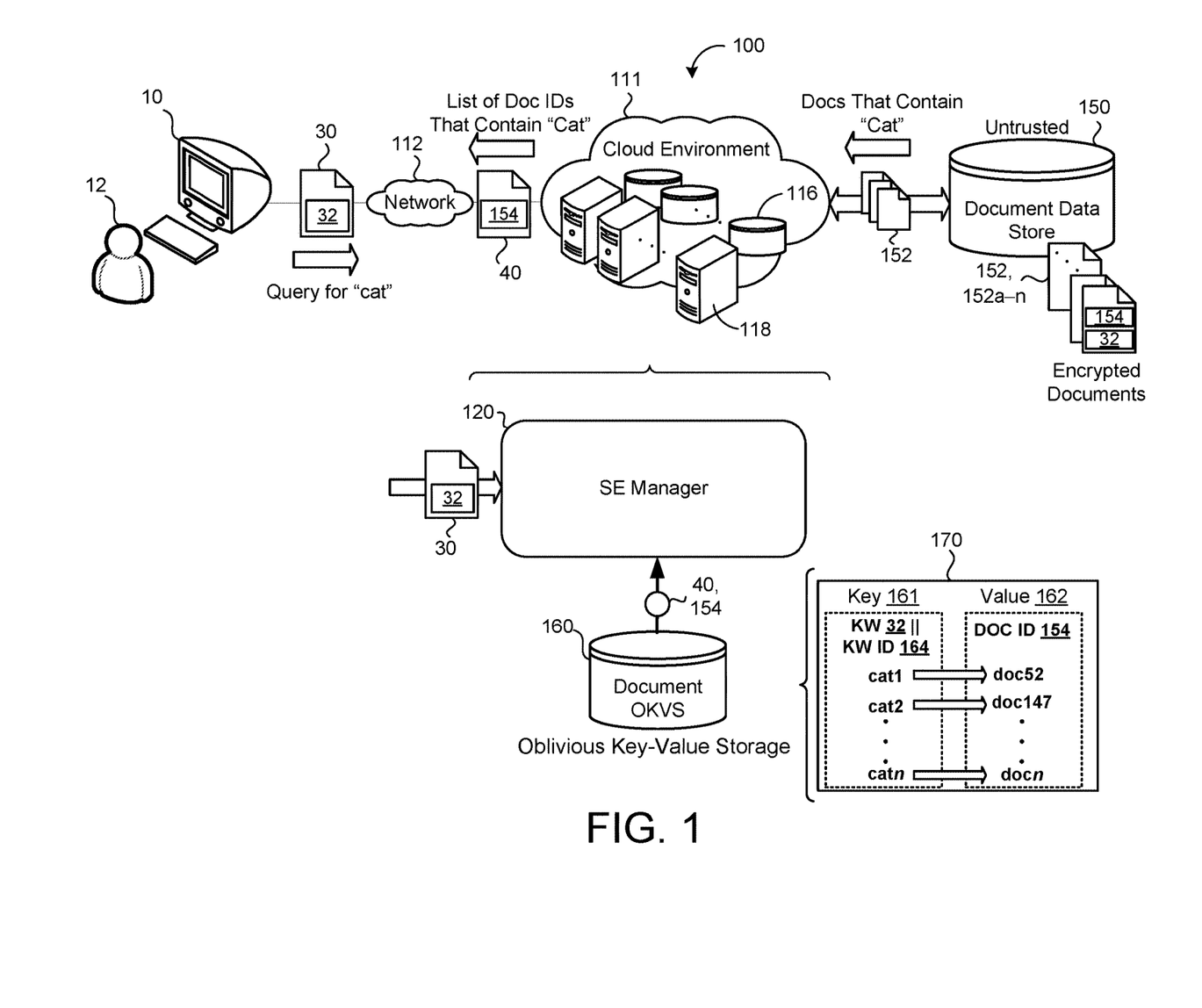
FIG. 1 is a schematic view of an example system for providing response-hiding searchable encryption.

Referring to FIG. 1, in some implementations, an example system 100 includes a user device 10 associated with a respective user or client 12 and in communication with a remote system 111 via a network 112. The user device 10 may correspond to any computing device, such as a desktop workstation, a laptop workstation, or a mobile device (i.e., a smart phone). The remote system 111 may be a single computer, multiple computers, or a distributed system (e.g., a cloud environment) having scalable/elastic computing resources 118 (e.g., data processing hardware) and/or storage resources 116 (e.g., memory hardware). A document data store 150 is overlain on the storage resources 116 to allow scalable use of the storage resources 116 by one or more of the client or computing resources 118. The document data store 150 is configured to store a corpus of encrypted documents 152, 152a-n. Each document 152 includes a document identifier 154 that uniquely identifies the associated document 152 (e.g., a document name). Each document 152 also includes a set of keywords 32. The set of keywords 32 includes all keywords that appear in the associated encrypted document 152. As used herein, a document 152 may refer to any encrypted item uploaded onto the remote system 111 for storage within the document data store 150, such as, without limitation, emails, calendar events, notes, database entries, etc. In some examples, the remote system 111 executes a Searchable Encryption (SE) manager 120 for managing access to the encrypted documents 152 within the data storage 150.

The SE manager 120, in some examples, receives a search query 30 from the user device 10 via the network 112. The search query 30 includes one or more keywords 32 that the user 12 is searching for within one or more of the encrypted documents 152 stored in the untrusted document data store 150. For example, the user 12 may wish to determine which, if any, encrypted documents 152 include the specific keyword 32 "cat". In response to the search query 30, the SE manager 120 returns, in some examples, a list 40 of document identifiers (IDs) 154 that each uniquely identify a respective one of the encrypted document 152 that contain the keyword(s) 32 included in the search query 30 (e.g., the list 40 of document identifiers that contain the keyword 32 "cat"). In other examples, the SE manager 120 returns other relevant information, such as metadata regarding the keyword, related topics of identified documents, portions of the document text, or even the entire document text. If the keyword is associated with a definition (e.g., the document is a dictionary), the definition may also be returned.

To fulfil the user's search query 30, the SE manager 120 accesses a document oblivious key-value storage (OKVS) 160. An OKVS, like ORAM, conceals client 12 access patterns to data within the OKVS 160. An OKVS maintains a key-value map 170 where each key 161 is uniquely associated to a value 162. The oblivious nature of the OKVS ensures that the OKVS only leaks (i.e., exposes) the number of operations performed and the maximum capacity of unique keys to an adversary. That is, an adversary monitoring the accesses to the OKVS 160 cannot determine the values 162 read from or written to the OKVS 160. The document OKVS 160 includes an array or list of keys 161, and each key 161 is associated with one or more values 162. In some examples, each key 161 of the document OKVS 160 includes a keyword 32 (i.e., one of the keywords 32 of the encrypted documents 152) concatenated with a keyword identifier 164. The key 161 (i.e., the keyword 32 concatenated with the keyword ID 164) may be associated with a value 162 that includes a document identifier 154. That is, each keyword 32 concatenated with the keyword ID 164 is associated with a document ID 154 that the keyword 32 appears in.

In the example shown, the key 161 "cat1" (i.e., the keyword 32 "cat" is concatenated with the keyword ID 164 "1") is associated with the document ID 154 "doc52." That is, the keyword 32 "cat" appears in the encrypted document 152 associated with the document ID 154 "doc52". Similarly, the key 161 "cat2" (i.e., the keyword 32 "cat" is concatenated with the keyword ID 164 "2") is associated with the value "doc147" (i.e., the document ID 154 "doc147") and the key 161 "catn" is associated with the value 162 "docn". The SE manager 120, after receiving the search query 30 containing a keyword 32, accesses the document OKVS 160 to obtain a list 40 of document IDs 154 that contain the queried keyword 32. For example, if the query 30 includes the keyword 32 "cat", the SE manager 120 may access the document OKVS 160 to obtain each value 162 associated with the keyword 32 "cat". Each keyword ID 164 may include a unique numerical indicator for that keyword 32 (e.g., '1', '2', '3', etc.). The SE manager 120 may repeatedly access the document OKVS 160 with a key 161 of the keyword 32 (e.g., "cat") and an incrementing keyword ID 164. That is, the SE manager 120 may access the value 162 associated with the key 161 "cat1", and then access the value 162 associated with the key 161 "cat2", then "cat3", "cat4", and so on and so forth until all of the keys 161 with the respective keyword 32 have been accessed. The SE manager 120 may add the document ID 154 (i.e., the value 162) obtained for each accessed key 161 to the list 40 of document IDs. Once complete (i.e., all keys 161 associated with the keyword 32 have been accessed), the SE manager 120 may return the list 40 to the user device 10. In some examples, the keyword ID 164 indicates a creation date of the document identifier 154 relative to creation dates of the other document identifiers 154 in the list 40 of document identifiers 154. For example, when an encrypted document 152 is uploaded, the SE manager 120 may assign a keyword ID 164 that is greater than any previously assigned keyword IDs 164. Thus, the greater the keyword ID 164, the later in time (relative to the other documents 152) a respective document 152 was uploaded. In some examples, the creation date of the document identifier 154 refers to a last update to the encrypted document 152 uniquely identified by the document identifier 154.

Figure 2:
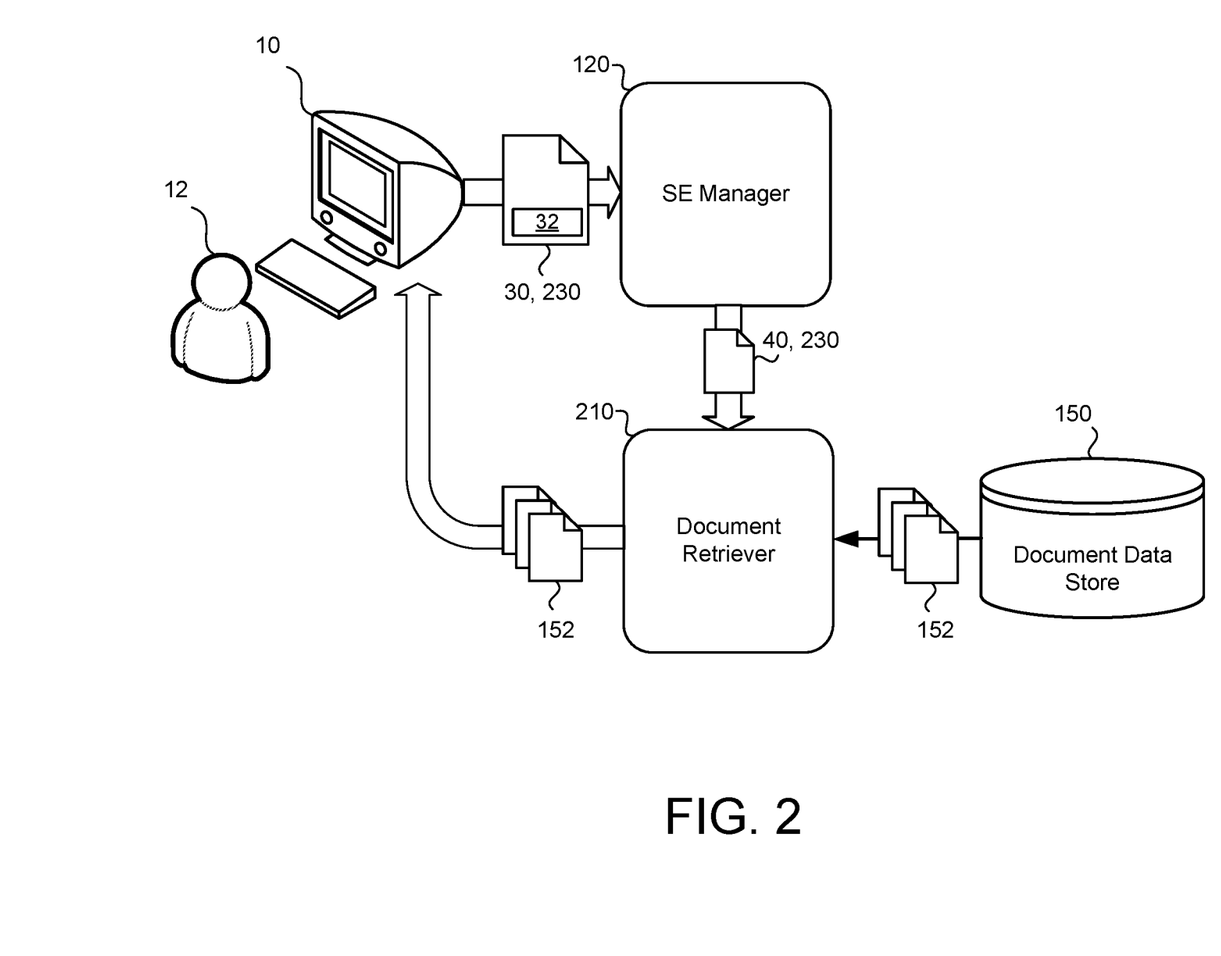
FIG. 2 is a schematic view of an example system for retrieving documents that include a queried keyword.

Referring now to FIG. 2, in some implementations, the SE manager 120, after receiving the search query 30 with keyword 32, sends the list 40 of document IDs to a document retriever 210. The document retriever 210 retrieves the encrypted documents 152 from the data store 150 that are uniquely identified by the document identifiers 154 in the list 40. The document retriever 210 may then return the retrieved encrypted documents 152 to the user device 10. In some examples, the SE manager 120 receives a read request 230 from the user device 10 that includes one or more document IDs 154 from the list 40 of document IDs returned by the SE manager 120 in response to a query 30. In this case, the document retriever 210 receives the read request 230 from the SE manager 120 and similarly returns the encrypted documents 152 to the user device 10. The user device 10 may be configured to decrypt the retrieved documents 152. For example, the user device 10 may have access to private keys (e.g., client-side keys) to decrypt the documents 152. Accordingly, encrypted documents 152 only containing keywords 32 queried for by the user 12 may be returned to the user 12 (e.g., via the user device 10) without performing any decryption operations on the encrypted documents 152 stored in the untrusted data store 150.

Figure 3:
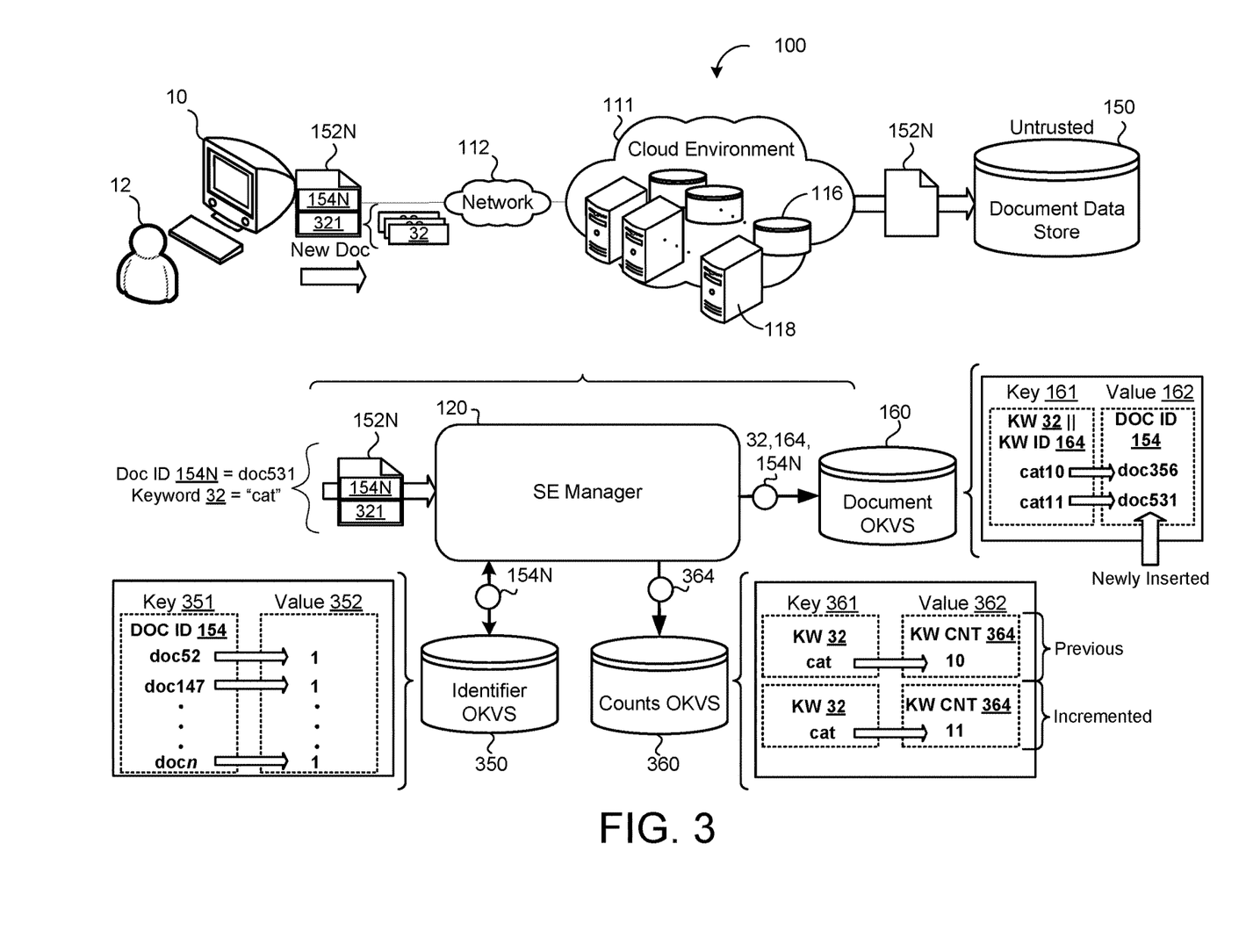
FIG. 3 is a schematic view of an example system for adding an encrypted document to a corpus of documents to be searched.

Referring now to FIG. 3, in some implementations, the SE manager 120 receives a new document identifier 154N and a set 321 of keywords 32 associated with a new encrypted documented 152N uploaded by the user 12 (via the user device 10) to document data store 150. The set 321 of keywords 32 represents all of the keywords 32 within the document 152N. In some examples, the SE manager 120 determines if the new document identifier 154N already exists in an identifier OKVS 350. The identifier OKVS 350 includes a set of document identifiers 154. Each of the document identifiers 154 uniquely identifies an associated encrypted document 152 stored in the document data store 150 such that the identifier OKVS 350 tracks the identifier 154 uniquely identifying each encrypted document 152 uploaded by the user 12. That is, each key 351 of the identifier OKVS 350 includes a respective document identifier 154 and corresponding value 352. In some examples, the value 352 is a constant (e.g., '1') to indicate that the corresponding document identifier 154 exists. In the example shown, the identifier OKVS 350 includes keys 351 (i.e., document IDs 154) "doc52", "doc147", . . . , and "docn", each associated with a value 352 of '1'. The SE manager 120 may access the identifier OKVS 350 to ensure that the new document identifier 154N does not uniquely identify an already existing encrypted document 152 stored on the document data store 150. When the new document identifier 154N does already exist (i.e., the new document identifier 154N is not unique), the identifier 154N and keywords 32 may be discarded and/or operations may terminate. In some examples, the system 100 may refuse to add the new encrypted document 152N. Prior to termination, the system 100 may perform fake operations (e.g., no-ops) in order to disguise whether the inserted document was valid or not. That is, the system 100 may perform a series of operations of a similar length when a document is inserted so that an adversary cannot easily tell if the operation was successful.

When the new document identifier 154N does not exist in the identifier OKVS 350, the SE manager 120 may update the identifier OKVS 350 with the new document identifier 154N to uniquely identifying the new encrypted document 152N. For each keyword 32 in the set 321 associated with the new encrypted document 152N, the SE manager 120, in some implementations, increments a keyword count 364 associated with the keyword 32 in a counts OKVS 360. The counts OKVS 360, in some examples, includes a keyword count 364 for each keyword 32 appearing in at least one of the encrypted documents 152. Specifically, each keyword count 364 indicates a number of the encrypted documents 152 that a respective keyword 32 appears in. That is, if the keyword 32 "cat" appears in ten separate encrypted documents 152 (irrespective of the number of times the keyword 32 appears within the same document 152), the keyword count 364 associated with the keyword 32 "cat" will equal ten. In this way, the counts OKVS 360 tracks the number of encrypted documents 152 that each keyword 32 appears in. For example, the counts OKVS 360 includes a key 361 that represents a keyword 32 (e.g., "cat") and each key 361 is associated with a value 362 that represents the keyword count 364 (e.g., "10") of the keyword 32.

With continued reference to FIG. 3, the SE manager 120 increments the keyword count 364 associated with each keyword 32. For example, if the previous keyword count 364 for the keyword 32 "cat" was "10", then the SE manager 120 may increment the keyword count 364 to "11". That is, the SE manager 120, in some examples, increments the keyword count 364 by one when the keyword count 364 is greater than or equal to one. When the keyword count 364 is not greater than one (e.g., the keyword count 364 is zero, null, etc.), the SE manager 120 may set the keyword count 364 to one. The updated or incremented keyword count 364 reflects the increase in the appearance of the keyword 32 in the encrypted documented 152 due to the new encrypted document 152N.

In some examples, the SE manager 120, prior to accessing the document OKVS 160 after receiving a search query 30, accesses the counts OKVS 360 to determine a number of the encrypted documents 152 that the keyword 32 specified in the search query 30 appears in. This allows for increased efficiency when the SE manager 120 accesses the document OKVS 160 as the SE manager 120 is aware of how many document identifiers 154 the SE manager 120 needs to retrieve. For example, if the queried keyword 32 is "cat", and the counts OKVS 360 indicates that "cat" appears in ten encrypted documents 152, the SE manager 120 knows it can stop accessing the document OKVS 160 after ten document identifiers 154 have been retrieved. Without this knowledge, the SE manager 120 may be forced to continue to access and search the entire document OKVS 160 to ensure all document identifiers 154 have been retrieved, because, in some examples, deleted documents 152 could lead to missing keyword IDs 164. For example, if the keyword 32 "cat" was removed from the document 152 associated with the "cat2" key 161, the SE manager 120 would be unaware if the document 152 associated with the "cat1" key 161 was the final document identifier 154 or if a document/keyword was removed, and therefore the SE manager 120 may continue searching.

In some implementations, the SE manager 120 inserts a concatenation of the keyword 32 and a respective keyword identifier 164 with the new document identifier 154N into the document OKVS 160. That is, in the example shown, the incremented keyword count 364 of "11" is concatenated with the keyword 32 (i.e., "cat11") and assigned the value 162 of "doc531." Thus, future search queries 30 for keywords 32 included in the new encrypted document 152N (e.g., "cat") will return the document identifier 154 associated with the new encrypted document 152N (e.g., "doc531").

Figure 4:
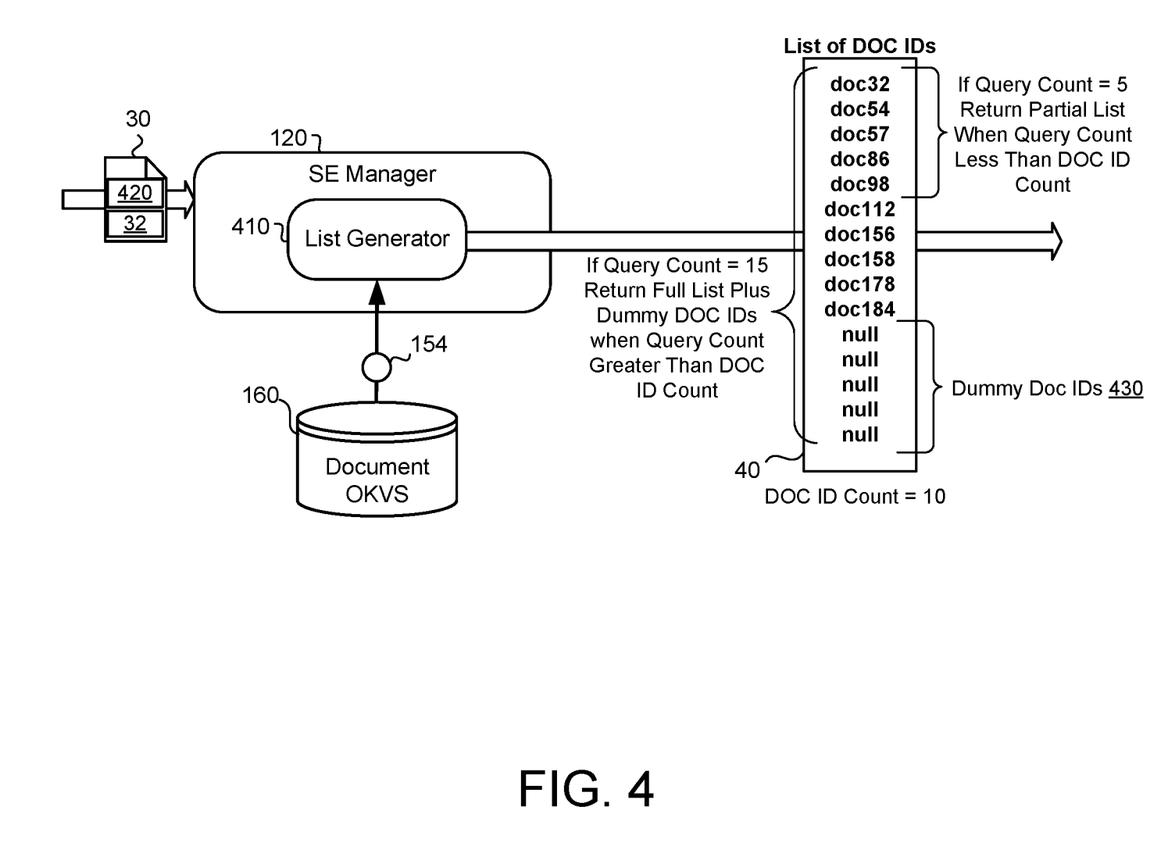
FIG. 4 is a schematic view a list generator for generating a list of document identifiers for the system of FIG. 1.

Referring now to FIG. 4, optionally, the search query 30 includes a query count 420. Because an adversary monitoring the system 100 may be able to obtain the number of document identifiers 154 that the SE manager 120 returns, it may be advantageous to conceal the actual number of document identifiers 154 returned. The query count 420 may specify a number of document identifiers 154 to obtain from the document OKVS 160. In some implementations, the SE manager 120 includes a list generator 410 that receives the search query 30 including the keyword 32 and the query count 420. The list generator 410 obtains the document identifiers 154 from the document OKVS 160 that uniquely identify encrypted documents 152 that include the keyword 32. The list generator 410 may limit the number of document identifiers 154 added to the list 40 to the number specified by the query count 420. For example, if there are ten encrypted documents 152 that include the keyword 32 (i.e., the document ID count equals ten) and the query count 420 is set to five, the list generator may return only the first five document identifiers 154 in the list 40. The list generator 410, in some examples, returns other combinations of document identifiers 154 (e.g., the last five) in any order and/or performs random shuffling.

Alternatively, if the query count 420 is larger and there are not enough document identifiers 154 to fulfill the query count 420, the list generator 410 may append one or more dummy document identifiers 430 for return to the user device 10. That is, the list generator 410 may append the dummy document identifiers 430 until the query count 420 is satisfied. For example, if the query count 420 is set to fifteen while there are only ten document identifiers 154 that are associated with the keyword 32, then the list generator 410 may append five dummy document identifiers 430 to the list 40 in order to satisfy the query count 420.

Figure 5:
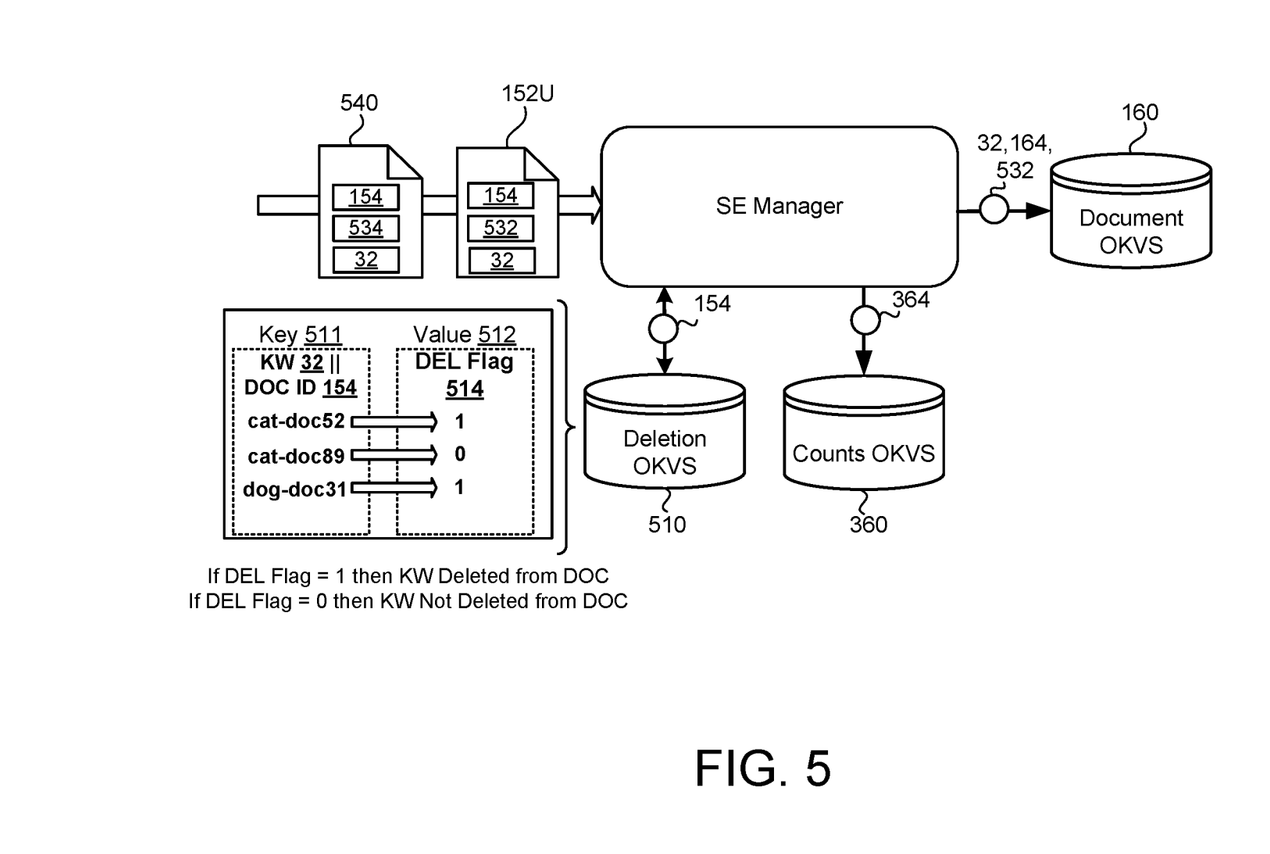
FIG. 5 is a schematic view of an example system for deleting keywords from an encrypted document.

Referring now to FIG. 5, in some implementations, the SE manager 120 accesses a deletion OKVS 510 to identify one or more document identifiers 154 associated with a deletion of a keyword 32. In some instances, an encrypted document 152 may be edited or modified to remove a keyword 32. For example, the user 12 may remove the keyword 32 "cat" from "doc52". The deletion OKVS 510 includes a key 511 of a keyword 32 concatenated with a document identifier 154 and a value 512 of a deletion flag 514. That is, each key 511 (i.e., the keyword 32 concatenated with the document ID 154) uniquely identifies a respective encrypted document 152 in which the keyword 32 is deleted. The SE manager 120, in some examples, excludes any document identifiers 154 from the list 40 that the deletion OKVS 510 indicates has the keyword 32 deleted. Returning to the previous example, the deletion OKVS 510 may include a key 511 (i.e., the keyword 32 concatenated with the document identifier 154) of "cat-doc152" with a value 512 associated with the deletion flag 514 of '1'. The deletion flag 514 has a value to indicate a keyword 32 has been deleted and a value to indicate the keyword 32 has not deleted (e.g., a Boolean value). For example, '1', 'true', etc., may indicate that the keyword 32 has been deleted while '0', false, etc., may indicate that the keyword 32 has not been deleted. Thus, the keyword 32 "cat" has been deleted (i.e., the deletion flag 514 is equal to '1') from the encrypted document 152 associated with the document identifier 154 "doc52". Similarly, the keyword 32 "dog" has been deleted from the encrypted document 152 associated with the document identifier 154 "doc31." The keyword 32 "cat" has not been deleted (i.e., the deletion flag 514 is equal to '0') from the encrypted document 152 associated with the document identifier 154 "doc89". That is, the user 12 may have deleted "cat" from "doc89" and then subsequently re-added "cat" back to the document 152 ("doc89"), or optionally, "cat" is one of the keywords 32 in a newly uploaded encrypted document 152.

In some implementations, the SE manager 120 receives a set 532 of keywords 32 associated with a document identifier 154 of an updated encrypted document 152U. The updated encrypted document 152U may be an entirely new encrypted document 152 or a modification to an existing encrypted document 152. For each keyword 32 in the set 532 associated with the updated encrypted document 152U, the SE manager 120, in some implementations, as described previously, increments a keyword count 364 associated with the keyword 32 in the counts OKVS 360. The SE manager 120 may also insert a concatenation of the keyword 32 and a respective keyword identifier 164 with the updated document identifier 154 into the document OKVS 160. Optionally, the SE manager 120 updates the deletion status/flag 514 of the associated concatenation 32, 154 to indicate that the keyword 32 is not deleted from the associated encrypted document 152.

With continued reference to FIG. 5, the SE manager 120, in some implementations, receives from the user device 10, a deletion request 540 that includes a set 534 of keywords 32 to be deleted from an existing encrypted document 152. The deletion request 540 also includes a document identifier 154 to uniquely identify the existing encrypted document 152. For each keyword 32 in the set 534, the SE manager 120 may update the deletion status 514 of the associated concatenation of the keyword 32 and document identifier 154 to indicate that the keyword 32 is deleted from the associated encrypted document 152.

Thus, the system 100 may include three or more independent OKVSs (the document OKVS 160, the counts OKVS 360, the identifier OKVS 350, and the deletion OKVS 510). However, in some implementations, all or some combination of these OKVSs are combined into a single OKVS. The SE manager 120 may initialize each OKVS with a capacity to store any number of unique keys. This capacity bounds the maximum number of document-keyword pairs. Each OKVS only leaks the number of operations performed and the maximum capacity of unique keys and maintains an O(lg n) efficiency. That is, all an adversary may learn when observing the system 100 is the number of document identifiers returned (which, as discussed previously, may be obfuscated through the query count) and the maximum size of newly uploaded documents. The system is forward secure as no information about future inserted documents is leaked. The system 100 may be further response-hiding by, for example, encrypting the largest keyword count over all of the keywords and, when performing queries to the document OKVS 160, performing as many queries as the largest keyword count, as this ensures that an adversary cannot determine whether the queried keyword exists or not.

Figure 6:
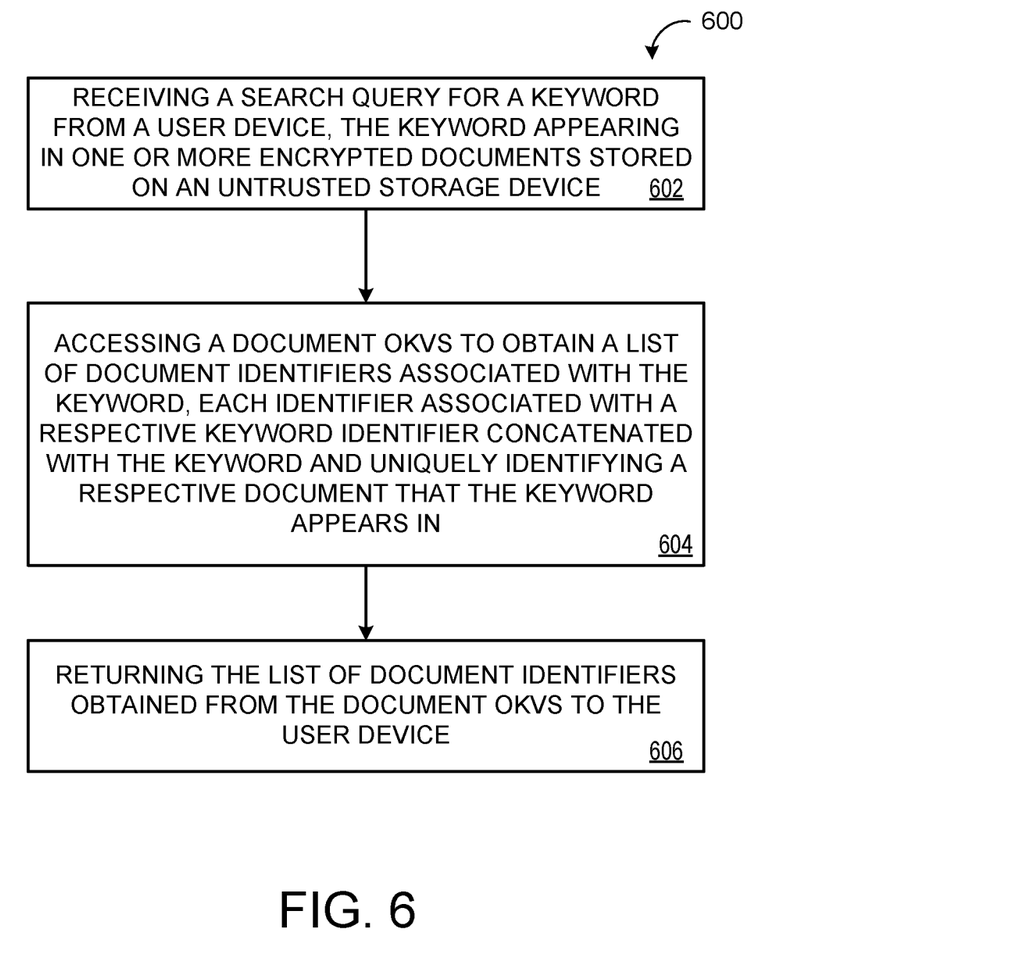
FIG. 6 is a flowchart of an example method for providing response-hiding searchable encryption.

FIG. 6 is a flowchart of an example method 600 for providing response-hiding searchable encryption. The flowchart starts at operation 602 with receiving, at data processing hardware 118, a search query 30 for a keyword 32 from a user device 10 associated with a user 12, the keyword 32 appearing in one or more encrypted documents 152 within a corpus of encrypted documents stored on an untrusted storage device 150. At operation 604, the method 600 also includes accessing, by the data processing hardware 118, a document oblivious key-value storage (OKVS) 160 to obtain a list of document identifiers 154 associated with the keyword 32, each document identifier 154 in the list 40 of document identifiers 154 associated with a respective keyword identifier 164 concatenated with the keyword 32 and uniquely identifying a respective one of the one or more encrypted documents 152 that the keyword 32 appears in. At operation 606, the method 600 also includes returning, by the data processing hardware 118, the list of document identifiers 154 obtained from the document OKVS 160 to the user device 10.

Figure 7:
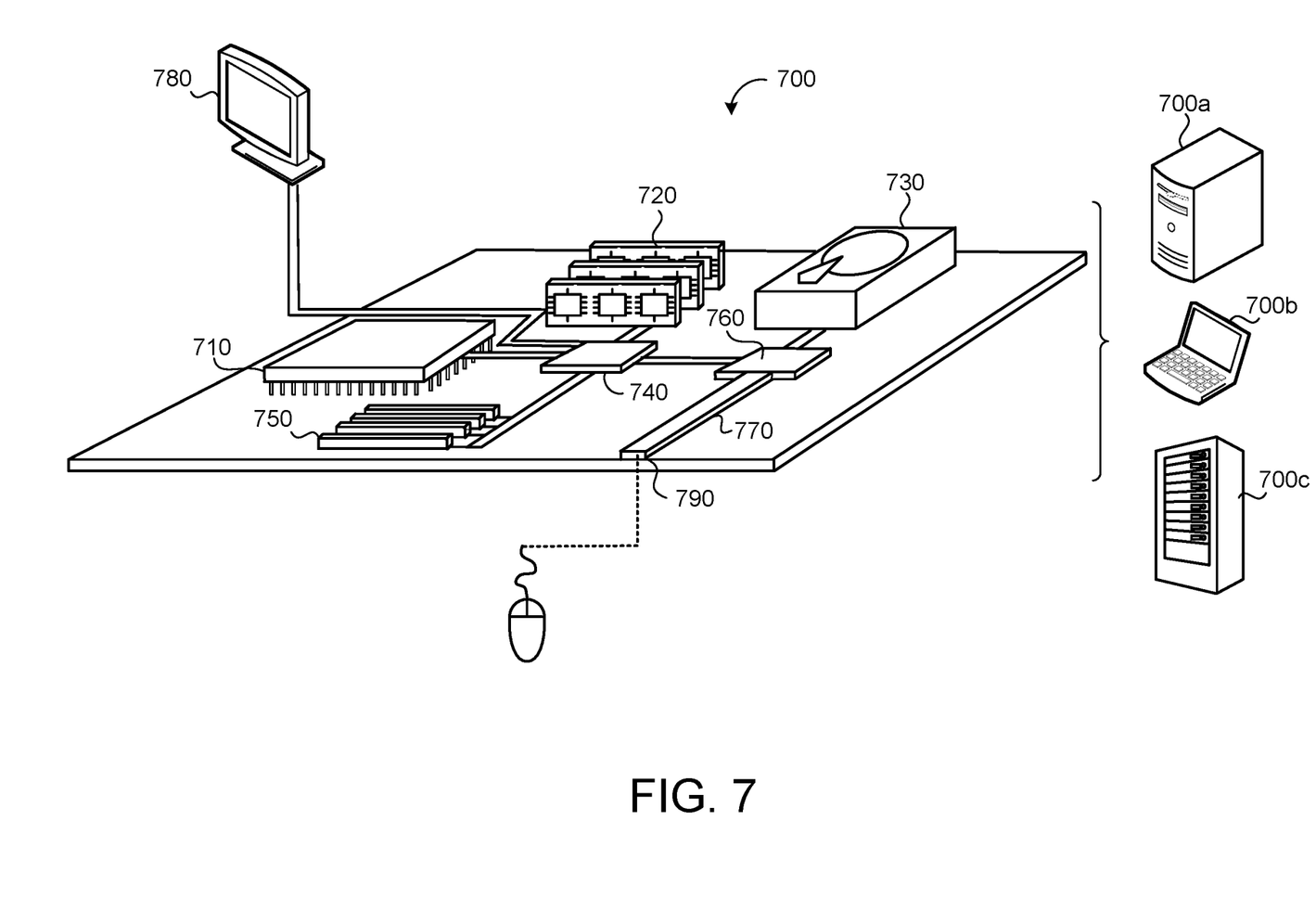
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
   receiving a search query for a keyword from a user device, the keyword appearing in one or more encrypted documents within a corpus of encrypted documents stored on an untrusted storage device;
   obtaining, from a document oblivious key-value storage (OKVS), a list of document identifiers associated with the keyword, the document OKVS comprising:
   oblivious random access memory (ORAM); and
   a plurality of key-value pairs, each key-value pair comprising:
      a key comprising the keyword concatenated with a respective keyword identifier; and
      a value uniquely identifying a respective one of the one or more encrypted documents; and
   returning the list of document identifiers obtained from the document OKVS to the user device.

2. The computer-implemented method of claim 1, wherein the ORAM comprises at least one of:
   path ORAM;
   square root ORAM; or
   tree-based ORAM.

3. The computer-implemented method of claim 1, wherein the operations further comprise:
   appending one or more dummy document identifiers to the list of document identifiers; and
   returning the list of document identifiers comprising the appended one or more dummy document identifiers to the user device.

4. The computer-implemented method of claim 1, wherein obtaining the list of document identifiers associated with the keyword comprises:
   accessing the document OKVS using a respective key associated with the keyword and an initial keyword identifier;
   incrementing the initial keyword identifier; and
   accessing the document OKVS using the respective key associated with the keyword and the incremented keyword identifier.

5. The computer-implemented method of claim 1, wherein the operations further comprise, for a new encrypted document uploaded by the user device into the corpus of encrypted documents stored on the untrusted storage device:

receiving, from the user device, a set of keywords associated with the new encrypted document and a new document identifier uniquely identifying the new encrypted document;

determining that the new document identifier does not exist in an identifier OKVS, the identifier OKVS comprising ORAM and a set of document identifiers, each document identifier in the set of document identifiers uniquely identifying a respective one of the encrypted documents within the corpus of encrypted documents stored on the untrusted storage device; and based on determining that the new document identifier does not exist in the identifier OKVS, updating the identifier OKVS with the new document identifier uniquely identifying the new encrypted document.

6. The computer-implemented method of claim 5, wherein the operations further comprise, for each keyword in the set of keywords associated with the new encrypted document:

incrementing a keyword count associated with the keyword in a counts OKVS, the counts OKVS comprising ORAM and a plurality of keyword counts, each keyword count indicating a number of the encrypted documents within the corpus of encrypted documents that a respective keyword appears in; and inserting a concatenation of the keyword and a respective keyword identifier associated with the new document identifier into the document OKVS.

7. The computer-implemented method of claim 6, wherein the operations further comprise:

determining that the keyword count is greater than or equal to one; and based on determining that the keyword count is greater than or equal to one, increasing the keyword count by one.

8. The computer-implemented method of claim 6, wherein the operations further comprise:

determining that the keyword count is not greater than or equal to one; and based on determining that the keyword count is not greater than or equal to one, setting the keyword count to one.

9. The computer-implemented method of claim 1, wherein the operations further comprise, prior to obtaining the list of document identifiers associated with the keyword, accessing a counts OKVS to determine a number of the one or more encrypted documents the keyword appears in, the counts OKVS comprising a plurality of keyword counts, each keyword count indicating a number of the encrypted documents within the corpus of encrypted documents that a respective keyword appears in.

10. The computer-implemented method of claim 1, wherein the document OKVS resides at a cloud computing environment.

11. A system comprising:

data processing hardware; and memory hardware in communication with the data processing hardware, the memory hardware storing instructions that when executed on the data processing hardware cause the data processing hardware to perform operations comprising:

receiving a search query for a keyword from a user device, the keyword appearing in one or more encrypted documents within a corpus of encrypted documents stored on an untrusted storage device;

obtaining, from a document oblivious key-value storage (OKVS), a list of document identifiers associated with the keyword, the document OKVS comprising:

oblivious random access memory (ORAM); and a plurality of key-value pairs, each key-value pair comprising:

a key comprising the keyword concatenated with a respective keyword identifier; and a value uniquely identifying a respective one of the one or more encrypted documents; and returning the list of document identifiers obtained from the document OKVS to the user device.

12. The system of claim 11, wherein the ORAM comprises at least one of:

path ORAM;

square root ORAM; or tree-based ORAM.

13. The system of claim 11, wherein the operations further comprise:

appending one or more dummy document identifiers to the list of document identifiers; and returning the list of document identifiers comprising the appended one or more dummy document identifiers to the user device.

14. The system of claim 11, wherein obtaining the list of document identifiers associated with the keyword comprises:

accessing the document OKVS using a respective key associated with the keyword and an initial keyword identifier;

incrementing the initial keyword identifier; and accessing the document OKVS using the respective key associated with the keyword and the incremented keyword identifier.

15. The system of claim 11, wherein the operations further comprise, for a new encrypted document uploaded by the user device into the corpus of encrypted documents stored on the untrusted storage device:

receiving, from the user device, a set of keywords associated with the new encrypted document and a new document identifier uniquely identifying the new encrypted document;

determining that the new document identifier does not exist in an identifier OKVS, the identifier OKVS comprising ORAM and a set of document identifiers, each document identifier in the set of document identifiers uniquely identifying a respective one of the encrypted documents within the corpus of encrypted documents stored on the untrusted storage device; and based on determining that the new document identifier does not exist in the identifier OKVS, updating the identifier OKVS with the new document identifier uniquely identifying the new encrypted document.

16. The system of claim 15, wherein the operations further comprise, for each keyword in the set of keywords associated with the new encrypted document:

incrementing a keyword count associated with the keyword in a counts OKVS, the counts OKVS comprising ORAM and a plurality of keyword counts, each keyword count indicating a number of the encrypted documents within the corpus of encrypted documents that a respective keyword appears in; and inserting a concatenation of the keyword and a respective keyword identifier associated with the new document identifier into the document OKVS.

17. The system of claim 16, wherein the operations further comprise:

determining that the keyword count is greater than or equal to one; and based on determining that the keyword count is greater than or equal to one, increasing the keyword count by one.

18. The system of claim 16, wherein the operations further comprise:

determining that the keyword count is not greater than or equal to one; and based on determining that the keyword count is not greater than or equal to one, setting the keyword count to one.

19. The system of claim 11, wherein the operations further comprise, prior to obtaining the list of document identifiers associated with the keyword, accessing a counts OKVS to determine a number of the one or more encrypted documents the keyword appears in, the counts OKVS comprising a plurality of keyword counts, each keyword count indicating a number of the encrypted documents within the corpus of encrypted documents that a respective keyword appears in.

20. The system of claim 11, wherein the document OKVS resides at a cloud computing environment.

* * * * *